(12) United States Patent
Tu et al.

(10) Patent No.: US 11,275,907 B2
(45) Date of Patent: Mar. 15, 2022

(54) MACHINE TRANSLATION METHOD, APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Zhaopeng Tu, Shenzhen (CN); Shuming Shi, Shenzhen (CN); Tong Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 300 days.

(21) Appl. No.: 16/558,092

(22) Filed: Aug. 31, 2019

(65) Prior Publication Data

US 2019/0384822 A1 Dec. 19, 2019

Related U.S. Application Data

(63) Continuation of application No. PCT/CN2018/099808, filed on Aug. 10, 2018.

(30) Foreign Application Priority Data

Sep. 12, 2017 (CN) .......................... 201710819346.8

(51) Int. Cl.
*G06F 40/58* (2020.01)
*G06N 3/04* (2006.01)
*G06N 3/08* (2006.01)

(52) U.S. Cl.
CPC .......... *G06F 40/58* (2020.01); *G06N 3/0454* (2013.01); *G06N 3/08* (2013.01)

(58) Field of Classification Search
None
See application file for complete search history.

(56) References Cited

U.S. PATENT DOCUMENTS

2017/0192963 A1 7/2017 Ni et al.
2018/0011843 A1* 1/2018 Lee .......................... G06F 40/51

FOREIGN PATENT DOCUMENTS

| CN | 103646019 A | 3/2014 |
| CN | 105183720 A | 12/2015 |
| CN | 108304388 A | 7/2018 |

OTHER PUBLICATIONS

The World Intellectual Property Organization (WIPO) International Search Report for PCT/CN2018/099808 dated Nov. 5, 2018 5 Pages (including translation).

(Continued)

*Primary Examiner* — Quynh H Nguyen
(74) *Attorney, Agent, or Firm* — Anova Law Group, PLLC

(57) ABSTRACT

A machine translation method and an apparatus are provided. The method includes: obtaining, when translating a word fragment from a first language into a second language, a source representation vector of the word fragment. The source representation vector of the word fragment represents the word fragment in the first language. The method also includes obtaining a historical translation vector of the word fragment by querying historical translation information according to the source representation vector of the word fragment. The historical translation vector of the word fragment represents a historical translation situation corresponding to the word fragment. The method further includes translating the word fragment according to the historical translation vector of the word fragment.

17 Claims, 8 Drawing Sheets

(56) References Cited

OTHER PUBLICATIONS

The State Intellectual Property Office of the People's Republic of China (SIPO) Office Action 1 for 201710819346.8 dated May 5, 2019 7 Pages (including translation).
Longyue Wang et al., "Exploiting Cross-Sentence Context for Neural Machine Translation", arXiv 2017 6 Pages.
Sainbayar Sukhbaatar et al., "End-To-End Memory Networks", NIPS 2015 9 Pages.
Alex Graves et al., "Neural Turing Machines", arXiv 2014 26 Pages.
Korean Intellectual Property Office (KIPO) Office Action 1 for 2019-7032061 dated Jan. 12, 2021 8 Pages (including translation).
Xing Wang et al., "Translating Phrases in Neural Machine Translation," arXiv:1708.01980, Aug. 7, 2017 (Aug. 7, 2017). 11 Pages.

\* cited by examiner

MACHINE TRANSLATION METHOD, APPARATUS, COMPUTER DEVICE, AND STORAGE MEDIUM

CROSS-REFERENCES TO RELATED APPLICATIONS

This application is a continuation application of PCT Patent Application No. PCT/CN2018/099808, filed on Aug. 10, 2018, claims priority to Chinese Patent Application No. 201710819346.8, entitled "MACHINE TRANSLATION METHOD AND APPARATUS" filed with the China National Intellectual Property Administration on Sep. 12, 2017, the entire contents of both of which are incorporated herein by reference.

FIELD OF TECHNOLOGY

This application relates to the field of machine learning technologies, and in particular, to a machine translation method, an apparatus, a computer device, and a storage medium.

BACKGROUND OF THE DISCLOSURE

Neural Machine Translation (NMT) is a machine translation technology, using an encoder-decoder framework to implement a process of "understanding a semantic meaning and then performing translation".

When a word in a language is translated into another language, the word usually corresponds to a plurality of different words. To avoid a problem that a same word at different positions in a same article has different translation results, in the related technology, a Hierarchical Recurrent Neural Network (HRNN) module may be additionally disposed based on a conventional NMT system. When a specific word fragment is translated, translation results of the several previous sentences are summarized by using the HRNN, and a current word fragment is translated with reference to the translation results of the previous sentences.

However, when summarizing the translation results of the several previous sentences, the HRNN network needs to occupy a large amount of calculation overheads. To ensure translation efficiency, in actual applications, only translation results of a few previous sentences (usually, three previous sentences) can be summarized, leading to a limited improvement to a translation effect.

SUMMARY

To resolve the related technology, when summarizing translation results of several previous sentences, an HRNN network can only summarize translation results of a few previous sentence, leading to a problem of a limited improvement to a translation effect. Embodiments of this application provide a machine translation method, an apparatus, a computer device, and a storage medium, and technical solutions are as follows:

According to an aspect, a machine translation method is provided, and may be performed by a computer device. The method includes: obtaining, when translating a word fragment from a first language into a second language, a source representation vector of the word fragment. The source representation vector of the word fragment represents the word fragment in the first language. The method also includes obtaining a historical translation vector of the word fragment by querying historical translation information according to the source representation vector of the word fragment. The historical translation vector of the word fragment represents a historical translation situation corresponding to the word fragment. The method further includes translating the word fragment according to the historical translation vector of the word fragment.

According to an aspect, a machine translation apparatus is provided, including a memory and a processor coupled to the memory. The processor is configured to: obtain, when translating a word fragment from a first language into a second language, a source representation vector of the word fragment. The source representation vector of the word fragment represents the word fragment in the first language. The processor is also configured to obtain a historical translation vector of the word fragment by querying historical translation information according to the source representation vector of the word fragment. The historical translation vector of the word fragment represents a historical translation situation corresponding to the word fragment. The processor is further configured to translate the word fragment according to the historical translation vector of the word fragment.

According to an aspect, a computer device is provided, including a processor and a memory, the memory storing at least one instruction, at least one program, a code set, or an instruction set, the at least one instruction, the at least one program, the code set, or the instruction set being loaded and executed by the processor to perform the machine translation method as stated above.

According to an aspect, a non-transitory computer-readable storage medium is provided, the storage medium storing at least one instruction, at least one program, a code set, or an instruction set, the at least one instruction, the at least one program, the code set, or the instruction set being loaded and executed by a processor to perform the machine translation method as stated above.

The technical solutions provided in this application may include the following beneficial effects:

In a case that a word fragment is translated, a translation situation of the word fragment in a historical translation process is considered comprehensively, and a current translation result is affected by the translation situation of the word fragment in the historical translation process. Because translation situations of a word fragment in a historical translation process have a relatively broad coverage, and may be some or all of translation situations of a translation system for same or similar word fragments before a current moment, a result of translating a word fragment by using the foregoing method is closer to a translation result of a same word fragment in the historical translation process, thereby improving translation accuracy.

It is to be understood that the above general descriptions and the following detailed descriptions are merely for exemplary and explanatory purposes, and cannot limit this application.

BRIEF DESCRIPTION OF THE DRAWINGS

The accompanying drawings, which are incorporated herein and constitute a part of this specification, illustrate embodiments consistent with this application and, together with the specification, serve to explain the principles of this application.

DESCRIPTION OF EMBODIMENTS

Figure 1:
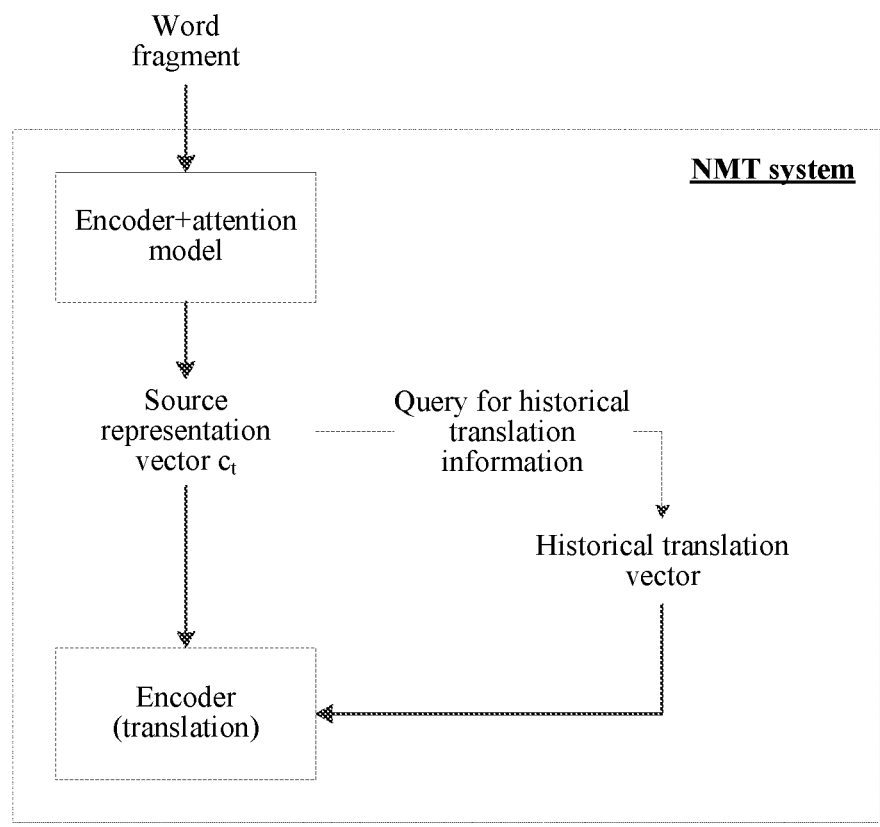
FIG. 1 is a schematic diagram of a machine translation procedure according to an exemplary embodiment.

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. The implementations set forth in the following description of exemplary embodiments do not represent all implementations consistent with this application. Instead, they are merely examples of apparatuses and methods consistent with aspects related to this application as recited in the appended claims.

The solutions shown in respective embodiments of this application may be applied to a computer device. For example, the computer device may be a user terminal such as a smartphone, a tablet computer, an e-book reader, or the personal computer; or the computer device may alternatively be a server on a network side.

A machine translation method involved in each embodiment of this application is a translation method based on an NMT system. A conventional NMT system includes an encoder, an attention model, and a decoder, and a translation process of the conventional NMT system may be simply expressed as follows:

In a case that a to-be-translated word fragment (in the embodiments of this application, a word fragment may be a partial or whole complete sentence) is translated from a first language into a second language, for each word in the word fragment, an encoder generates a semantic vector of the word (each semantic vector may be a vector whose fixed quantity of dimensions is N, where N is a positive integer), and semantic vectors of respective words in the word fragment constitute a semantic vector sequence of the word fragment.

The attention model reads the foregoing semantic vector sequence and a previous moment state $s_{t-1}$ of a decoder (a state of a decoder is also an N-dimensional vector). An alignment probability (the alignment probability ranges from 0 to 1, where a higher probability value indicates that the word is more related to a to-be-generated target word) is output for each word of the word fragment according to the previous moment state $s_{t-1}$ of the decoder, and the alignment probability of each word and a semantic vector are weighted to generate a source representation vector $c_t$ of the word fragment at a current moment. The source representation vector $c_t$ may also be referred to as a source context representation of a current word fragment. The source representation vector $c_t$ is a vector representing a corresponding word fragment in the first language, and represents source content that is translated at the current moment.

The decoder reads the source representation vector $c_t$, the previous moment state $s_{t-1}$ of the decoder, and a previous generated word $y_{t-1}$ (that is, an N-dimensional representation vector corresponding to a translation result of a previous word fragment), and outputs a current moment state $s_t$ of the decoder.

The decoder generates an output vector through a neural network according to the current moment state $s_t$, the source representation vector $c_t$, and the previous generated word $y_{t-1}$, compares the output vector with target representation vectors corresponding to all target word fragments (that is, a word fragment in a target language), and selects a target word fragment having a highest similarity as a final output result. The target representation vector is a vector representing a corresponding word fragment in the second language.

FIG. 1 is a schematic diagram of a machine translation procedure according to an exemplary embodiment. In some embodiments of this application, based on the foregoing conventional NMT system, in a case that the word fragment is translated from the first language into the second language, after the source representation vector $c_t$ of the currently translated word fragment is obtained through the encoder and the attention model, the NMT system queries, according to the source representation vector of the word fragment, for historical translation information, obtains a historical translation vector of the word fragment, the historical translation vector being used to represent a historical translation situation of a corresponding word fragment, and translates, through the decoder, the word fragment according to the historical translation vector of the word fragment. In the foregoing solution, in a case that a word fragment is translated, a translation situation of the word fragment in a historical translation process is considered comprehensively, and a current translation result is affected by the translation situation of the word fragment in the historical translation process. Because translation situations of a word fragment in a historical translation process have a relatively broad coverage, and may be some or all of translation situations of a translation system for same or similar word fragments before a current moment, a result of translating a word fragment by using the foregoing method is closer to a translation result of a same word fragment in the historical translation process, thereby greatly improving translation accuracy.

In the foregoing solution shown in FIG. 1, the queried historical translation information may include correspondences between source representation vectors of respective historical word fragments and intermediate vectors or resultant vectors of respective historical word fragments generated during a translation process. For example, the foregoing intermediate vector may include a decoder state of the translation system during translation of the historical word fragment. Alternatively, the foregoing intermediate vector may include an output vector generated by a decoder of the translation system during translation of the historical word fragment. The foregoing resultant vector may be a target representation vector corresponding to a final translation result obtained by the translation system during translation of the historical word fragment. The target representation vector is a vector used to represent a word fragment in the second language. For example, assuming that the first language is Chinese, the second language is English, a to-be-translated Chinese word fragment is "Pingguo", and the word fragment is translated into English to obtain a translation result "apple", in a translation system, a vector representing the word fragment "Pingguo" is a source representation vector, and a vector representing the word fragment "apple" is a target representation vector.

The subsequent embodiments of this application exemplify the solutions of the embodiments of this application by using an example in which the historical translation information may include correspondence between source representation vectors of respective historical word fragments and decoder states of respective historical word fragments.

Figure 2:
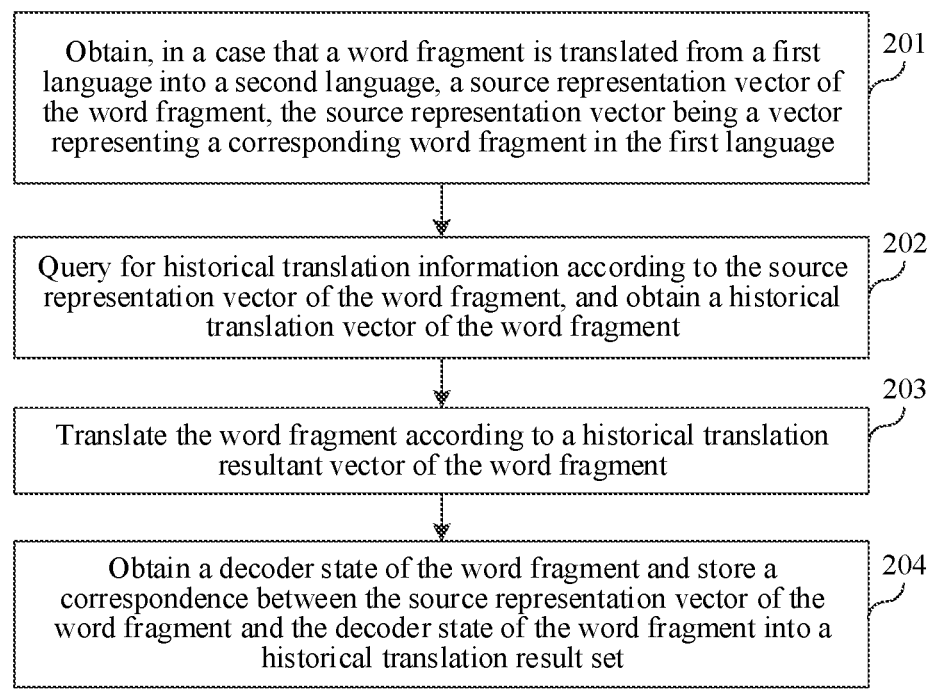
FIG. 2 is a flowchart of a machine translation method according to an exemplary embodiment.

FIG. 2 is a flowchart of a machine translation method according to an exemplary embodiment. The machine translation method may be applied to a computer device (for example, a user terminal or a server) providing a machine translation function based on an NMT system. As shown in FIG. 2, the machine translation method may include the following steps.

Step 201: Obtain, in a case that a word fragment is translated from a first language into a second language, a source representation vector of the word fragment, the source representation vector being a vector representing a corresponding word fragment in the first language.

For each word in to-be-translated word fragment, the computer device generates a semantic vector of the word. Semantic vectors of respective words in the word fragment constitute a semantic vector sequence of the word fragment. An alignment probability is output for each word of the word fragment according to a previous moment state $s_{t-1}$ of a decoder, and alignment probabilities of respective words and the semantic vectors of respective words are weighted to generate a source representation vector $c_t$ of the word fragment at a current moment.

The step of obtaining a source representation vector of a word fragment may be performed by an encoder and an attention model in the NMT system.

Step 202: Query for historical translation information according to the source representation vector of the word fragment, and obtain a historical translation vector of the word fragment, the historical translation vector being used to represent a historical translation situation corresponding to the word fragment.

In this step, the computer device may query for historical translation information. The historical translation information includes correspondences between source representation vectors of respective historical word fragments and decoder states of the respective historical word fragments. The computer device calculates similarities between the source representation vector of the word fragment and the source representation vectors of the respective historical word fragments; calculates weights of the decoder states of the respective historical word fragments according to the similarities between the source representation vector of the word fragment and the source representation vectors of the respective historical word fragments; and performs weighted summation on the decoder states of the respective historical word fragments according to the weights of the decoder states of the respective historical word fragments, to obtain the historical translation vector of the word fragment.

When calculating weights of the decoder states of the respective historical word fragments according to the similarities between the source representation vector of the word fragment and the source representation vectors of the respective historical word fragments, the computer device may directly use the similarities between the source representation vector of the word fragment and the source representation vectors of the respective historical word fragments as the weights of the decoder states of the respective historical word fragments, or the computer device may scale up or down the similarities between the source representation vector of the word fragment and the source representation vectors of the respective historical word fragments, a sum of the respective scaled-up or -down similarities is 1, and the respective scaled-up or -down similarities are used as weights of decoder states of the corresponding historical word fragments.

For example, after obtaining the source representation vector of the word fragment, the computer device outputs a relevant historical translation vector by searching an internal storage component (which stores the foregoing historical translation information) of the computer device. The storage component may be a Memory Neural Network (MemNN), Neural Turing Machines (NTMs), or the like.

Using a single-layer key-value MemNN as an example, a structure of the storage component includes two layers of neural networks: a key layer and a value layer. Elements in the key layer may be used to compare with a query to determine a degree of matching (that is, the foregoing similarity) between each element and a query, and elements in the value layer are weighted according to respective degrees of matching to output a final vector representation, where weights in weighted calculation may be the respective degrees of matching (that is, the foregoing similarities) or may be values obtained according to similarity calculation (in this case, a sum of the weights of the respective elements in the value layer is 1).

For example, the source representation vector $c_t$ of the word fragment is a key, and the corresponding decoder state $s_t$ is a value. A key-value pair $(k_w, v_w)$ of each element in a memory corresponds to a target word w generated according to the key-value pair. In the step, the query (that is, the source representation vector $c_t$ of the word fragment) is read, to output a probability distribution of each element in the memory. Assuming that a given query is the source representation vector $c_t$ of the word fragment, a probability of matching (the probability of matching herein indicates a probability that a translation result of the word fragment is the target word w, which is also the foregoing weight) between $c_t$ and target words of respective keys is calculated by comparing a degree of matching between $c_t$ and respective keys, a sum of probabilities of matching between $c_t$ and the target words corresponding to respective keys is 1, and the probability of matching can be calculated by using a dot product. A formula for calculating the dot product may be as follows:

$P_{Cache}(w/q) = \text{softmax}(q^T, k_w)$, where q is a source representation vector $c_t$, $q^T$ is a matrix transpose of q, $k_w$ is a key corresponding to the target word w in the key layer, softmax($q^T$, $k_w$) is that after matrix transposition is performed on q, a dot product calculation is performed on a result and $k_w$, and $P_{Cache}(w/q)$ represents a probability of matching between q and w.

Optionally, in some embodiments of this application, the storage component may alternatively learn of a corresponding matching function better by introducing a parameter.

For example, the storage component may calculate the foregoing probability of matching by using an instruction matching matrix, and its formula is as follows:

$P_{Cache}(w/q) = \text{softmax}(q^T, M, k_w)$, where a parameter M may be a parameter preset by development personnel, or a parameter M may be a parameter determined in advance through machine learning training.

Alternatively, the storage component may calculate the foregoing probability of matching by using an instruction conversion matrix, and its formula is as follows:

$P_{Cache}(w/q) = \text{softmax}(q_0^T, k_w, Z)$, $q_0 = qZ$, where a parameter Z may be a parameter preset by development personnel, or a parameter Z may be a parameter determined in advance through machine learning training.

In actual applications, in addition to a dot product calculation manner, the storage component may alternatively calculate probabilities of matching between $c_t$ and target words corresponding to respective keys in another manner, for example, calculate probabilities of matching between $c_t$ and target words corresponding to respective keys by using the Euclidean Distance algorithm.

After obtaining the probabilities of matching between $c_t$ and the target words corresponding to the respective keys, the storage component may perform weighted summation on values corresponding to the respective keys, to output a historical translation vector of the word fragment.

In the foregoing solution, description is provided by using an example in which a memory network is a storage structure of a storage component. In some embodiments of this application, a model type and a topological structure of the storage component are not specifically limited, and may be replaced with various other model structures, for example, may be replaced with Neural Turing Machines (NTMs) and variants thereof.

In addition, the foregoing solution is described by using a single-layer memory network as an example. However, a specific quantity of layers of the memory network is not limited in this embodiment of this application, that is, the foregoing storage component may be replaced with a multi-layer memory network structure.

In the foregoing solution, description is provided by using an example in which the source representation vector of the word fragment is used as a key, and a state representation of a decoder module is used as a value. However, a specific form of a key-value is not specifically limited in this embodiment of this application, and may be replaced with another appropriate NMT internal vector representation. For example, a vector representation output by the decoder module, namely, the foregoing output vector (output state), or a target representation vector (word embedding) of a finally generated target word is used as the value.

Step 203: Translate the word fragment according to the historical translation vector of the word fragment.

In some embodiments of this application, in a case that the word fragment is translated according to the historical translation vector of the word fragment, a past-future module may be integrated into the NMT system in the following three manners: probability distribution integration (e.g., probability interpolation), an additional context (e.g., auxiliary context input), and hidden layer representation integration (e.g., hidden layer representation interpolation).

I. Probability Distribution Integration

Figure 3:
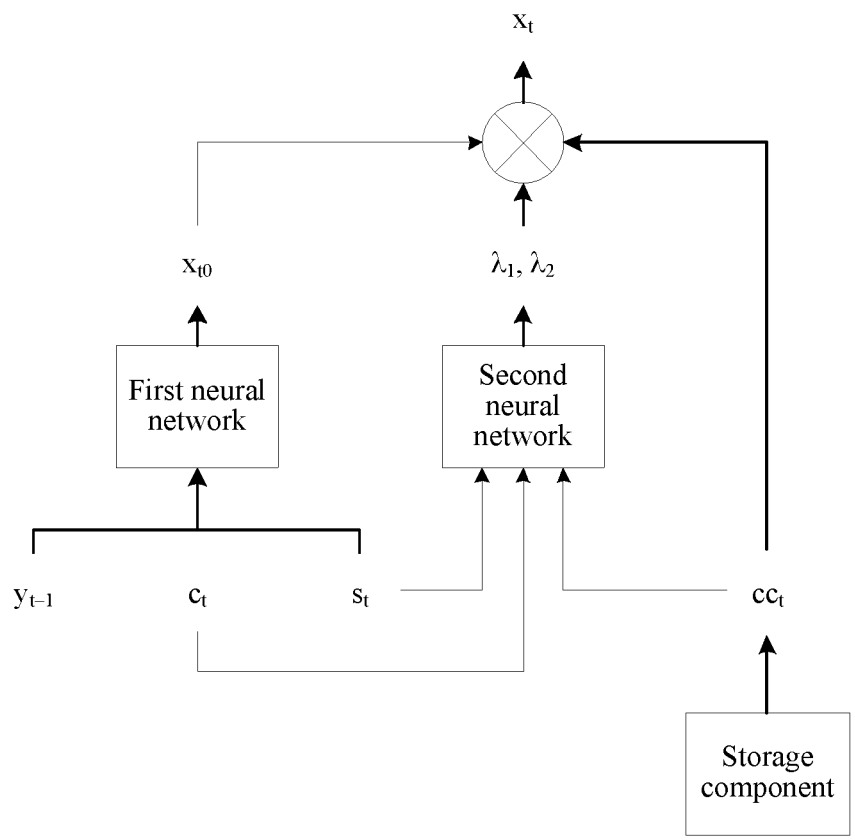
FIG. 3 is a schematic diagram of probability distribution integration involved in the embodiment shown in FIG. 2.

Referring to FIG. 3, FIG. 3 shows a schematic diagram of probability distribution integration involved in some embodiments of this application. In this manner, the computer device may input the source representation vector $c_t$ of the word fragment, the decoder state $s_t$ of the word fragment, and a target representation vector $y_{t-1}$ of a previous word fragment into a first neural network, to obtain an output vector $x_{t0}$ of the word fragment, the previous word fragment being a previous word fragment of the word fragment, and the target representation vector being a vector representing a corresponding word fragment in the second language; input the source representation vector $c_t$ of the word fragment, the decoder state $s_t$ of the word fragment, and a historical translation vector $cc_t$ of the word fragment into a second neural network to obtain a weight $\lambda_1$ of the historical translation vector of the word fragment; calculate a weight $\lambda_2$ of the output vector of the word fragment according to the weight $\lambda_1$ of the historical translation vector of the word fragment; perform weighted summation on the output vector $x_{t0}$ of the word fragment and the historical translation vector $cc_t$ of the word fragment according to the weight $\lambda_2$ of the output vector $x_{t0}$ of the word fragment and the weight $\lambda_1$ of the historical translation vector $cc_t$ of the word fragment, to obtain a corrected output vector $x_t$ of the word fragment; and determine a translation result of the word fragment according to the corrected output vector $x_t$ of the word fragment.

When the weight of the output vector of the word fragment is calculated according to the weight of the historical translation vector of the word fragment, a difference between 1 and the weight of the historical translation vector of the word fragment may be obtained as the weight of the output vector of the word fragment.

In some embodiments of this application, a historical translation result of the foregoing word fragment may be directly used as a part of the corrected output vector, linear interpolation is performed on a vector output by the decoder in the NMT system, to correct an output vector output by the decoder in the NMT system, and its formula may be as follows:

$$P(w) = (1-\lambda)P_{NMT}(w) + \lambda P_{Cache}(w), \text{ where}$$

$P(w)$ is a corrected probability of matching between the word fragment in the first language and the target word fragment w in the second language, $P_{NMT}(w)$ is a probability of matching between the word fragment and the target word fragment w in the second language that is obtained after inputting the source representation vector of the word fragment, the decoder state of the word fragment, and the target representation vector of the previous word fragment into the first neural network, $P_{Cache}(w)$ is a probability of matching between the word fragment and the target word fragment w that is output by the storage component, and $\lambda$ is controlled by a neural network (that is, the foregoing second neural network), to output different weights for requirements at different moments:

$$\lambda = f(c_t, s_t, cc_t), \text{ where}$$

$cc_t$ is the historical translation vector of the word fragment calculated in step 202, and f is the foregoing second neural network, and may be a multi-layer neural network or a simple sigmoid function.

Optionally, in some embodiments of this application, only $c_t$, $s_t$, and $cc_t$ are used as input to generate an interpolation 2. In some embodiments of this application, input of the function is not specifically limited, and other appropriate input, such as, a vector representation of a previous generated word (namely, the target representation vector $y_{t-1}$ of the previous word fragment), may be added.

II. Additional Context

Figure 4:
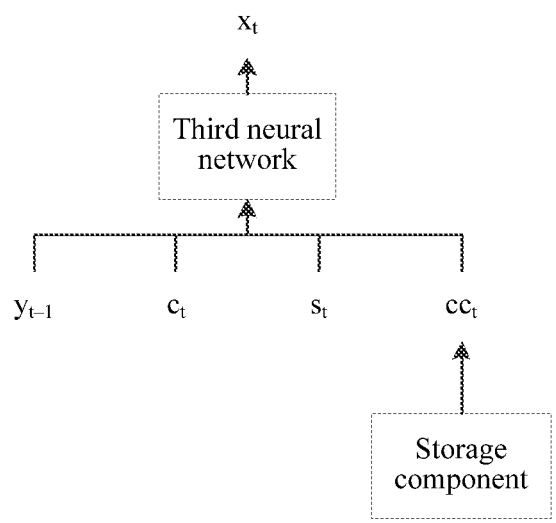
FIG. 4 is a schematic diagram of additional context processing involved in the embodiment shown in FIG. 2.

Referring to FIG. 4, FIG. 4 shows a schematic diagram of additional context processing involved in some embodiments of this application. In this manner, the computer device may input the source representation vector $c_t$ of the word fragment, the decoder state $s_t$ of the word fragment, a target representation vector $y_{t-1}$ of a previous word fragment, and a historical translation vector $cc_t$ of the word fragment into a third neural network, to obtain an output vector $x_t$ of the word fragment, the previous word fragment being a previous word fragment of the word fragment; and determine a translation result of the word fragment according to the output vector of the word fragment.

The historical translation vector of the word fragment calculated in the foregoing step 102 may be introduced as an additional information source into the NMT system, to calculate a probability distribution of the target word better. That is, a formula for calculating the probability distribution of the target word is changed from:

$$P_{NMT}(y_t)=\text{softmax}(g(y_{t-1},c_t,s_t))$$

to:

$$P_{NMT}(y_t)=\text{softmax}(g(y_{t-1},c_t,s_t,cc_t)), \text{ where}$$

softmax is a normalized function, and g is a multi-layer neural network.

Optionally, an impact of the additional input $cc_t$ is controlled by a parameter C. The parameter C may be preset by development personnel, or the parameter C may be obtained through machine training.

Optionally, in some embodiments of this application, the historical translation vector of the word fragment is directly introduced into the NMT system. In some embodiments of this application, an introduction manner of the historical translation vector of the word fragment is not specifically limited and may be replaced with weighted input ($\lambda^* cc_t$), to better control an impact of the historical translation vector of the word fragment on different target words. $\lambda$ may be obtained by calculation according to a calculation method in the foregoing probability integration manner.

III. Hidden Layer Representation Integration

Figure 5:
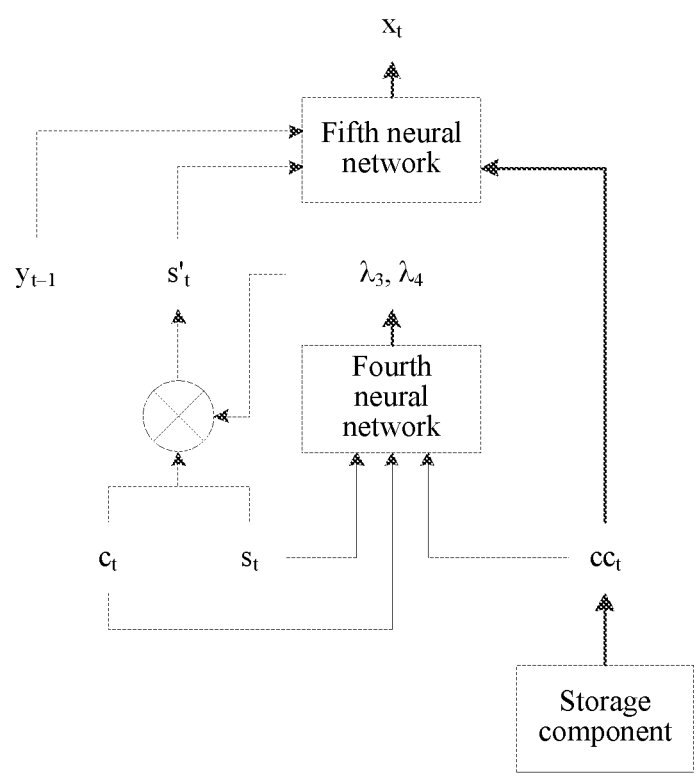
FIG. 5 is a schematic diagram of hidden layer representation integration processing involved in the embodiment shown in FIG. 2.

Referring to FIG. 5, FIG. 5 shows a schematic diagram of hidden layer representation integration processing involved in some embodiments of this application. In this manner, the computer device may input the source representation vector $c_t$ of the word fragment, the decoder state $s_t$ of the word fragment, and a historical translation vector $cc_t$ of the word fragment into a fourth neural network to obtain a weight $\lambda_3$ of the historical translation vector $cc_t$ of the word fragment; calculate a weight $\lambda_4$ of the decoder state $s_t$ of the word fragment according to the weight 23 of the historical translation vector $cc_t$ of the word fragment; perform weighted summation on the historical translation vector $cc_t$ of the word fragment and the decoder state $s_t$ of the word fragment according to the weight $\lambda_3$ of the historical translation vector $cc_t$ of the word fragment and the weight $\lambda_4$ of the decoder state $s_t$ of the word fragment, to obtain a corrected decoder state $s'_t$ of the word fragment; input the source representation vector $c_t$ of the word fragment, the corrected decoder state $s'_t$ of the word fragment, and a target representation vector $y_{t-1}$ of a previous word fragment into a fifth neural network, to obtain an output vector $x_t$ of the word fragment, the previous word fragment being a previous word fragment of the word fragment; and determine a translation result of the word fragment according to the output vector of the word fragment.

The historical translation vector $cc_t$ of the word fragment may be considered as target information corresponding to $c_t$ in the past translation history. In some embodiments of this application, the decoder state $s_t$ may be used as a value, so that the historical translation vector of the word fragment corresponds to the decoder state. The decoder state $s_t$ is first integrated with the historical translation vector of the word fragment, and then, a probability distribution of the target word is further calculated through a standard procedure. Specifically, the decoder state is updated in the following manner:

$$s'_t=(1-\lambda)s_t+\lambda cc_t.$$

For a calculation manner of $\lambda$, refer to $\lambda$ in the foregoing first calculation manner.

Optionally, in some embodiments of this application, $s_t$ and $cc_t$ may be combined in a linear interpolation manner. In some embodiments of this application, an integration manner is not specifically limited and may be replaced with any other integration manner such as integration by using a neural network (two representations are input of the neural network, and output is a new representation).

In addition, in some embodiments of this application, hidden layer representations are integrated on a level of the decoder state. However, in some embodiments of this application, a hidden layer representation is not specifically limited, and may be replaced with an intermediate representation of another decoder end, for example, may be replaced with a vector representation (in this case, the value is replaced with a corresponding vector representation) output by the decoder module.

In addition, in some embodiments of this application, $\lambda$ is a floating point number (scalar). In this embodiment of this application, a specific form of $\lambda$ is not limited, and may be replaced with a vector having a quantity of dimensions the same as that of a hidden layer representation vector, where each dimension controls integration of the corresponding vectors in the dimension.

Step 204: Obtain a decoder state of the word fragment and store a correspondence between the source representation vector of the word fragment and the decoder state of the word fragment into the historical translation information.

Optionally, if the historical translation information further includes another type of information, for example, further includes a correspondence between a source representation vector of a historical word fragment and an output vector of the historical word fragment, or further includes a correspondence between a source representation vector of a historical word fragment and a target source representation vector of the historical word fragment, the computer device further stores a source representation vector of a current word fragment and an output vector or a target representation vector of the current word fragment into the historical translation information.

In conclusion, in the machine translation method shown in some embodiments of this application, in a case that the word fragment is translated from the first language into the second language, after the source representation vector $c_t$ of the currently translated word fragment is obtained (the source representation vector is a vector representing a corresponding word fragment in the first language), historical translation information is queried for according to the source representation vector of the word fragment, a historical translation vector of the word fragment is obtained, and the word fragment is translated according to the historical translation vector of the word fragment. In the foregoing solution, in a case that a word fragment is translated, a translation situation of the word fragment in a historical translation process is considered comprehensively, and a current translation result is affected by the translation situation of the word fragment in the historical translation process. Because translation situations of a word fragment in a historical translation process have a relatively broad coverage, and may be some or all of translation situations of a translation system for same or similar word fragments before a current moment, a result of translating a word fragment by using the foregoing method is closer to a translation result of a same word fragment in the historical translation process, thereby improving translation accuracy.

The disclosed method yields better performance than traditional neural network translation system, particularly in enhancing translation consistency in a same passage/article and reducing translation issues produced by words with multiple meanings without losing much efficiency. An experiment was performed to evaluate one embodiment of the disclosed method against a basic translation model. BLEU (bilingual evaluation understudy) algorithm is used to evaluate the translation quality of the disclosed embodiment. A higher BLEU value indicates a better translation performance. Experiment result shows that, when first 2000 words (about 80-100 sentences) are recorded and translated, the average translation speed is about 1.79 second per sentence, which only slows down a little bit from original speed (1.57 second per sentence). Comparing to the basic translation model whose BLEU value is 30.6, the disclosed embodiment resulted a BLEU value of 31.6, which is significantly higher than the basic model.

Figure 6:
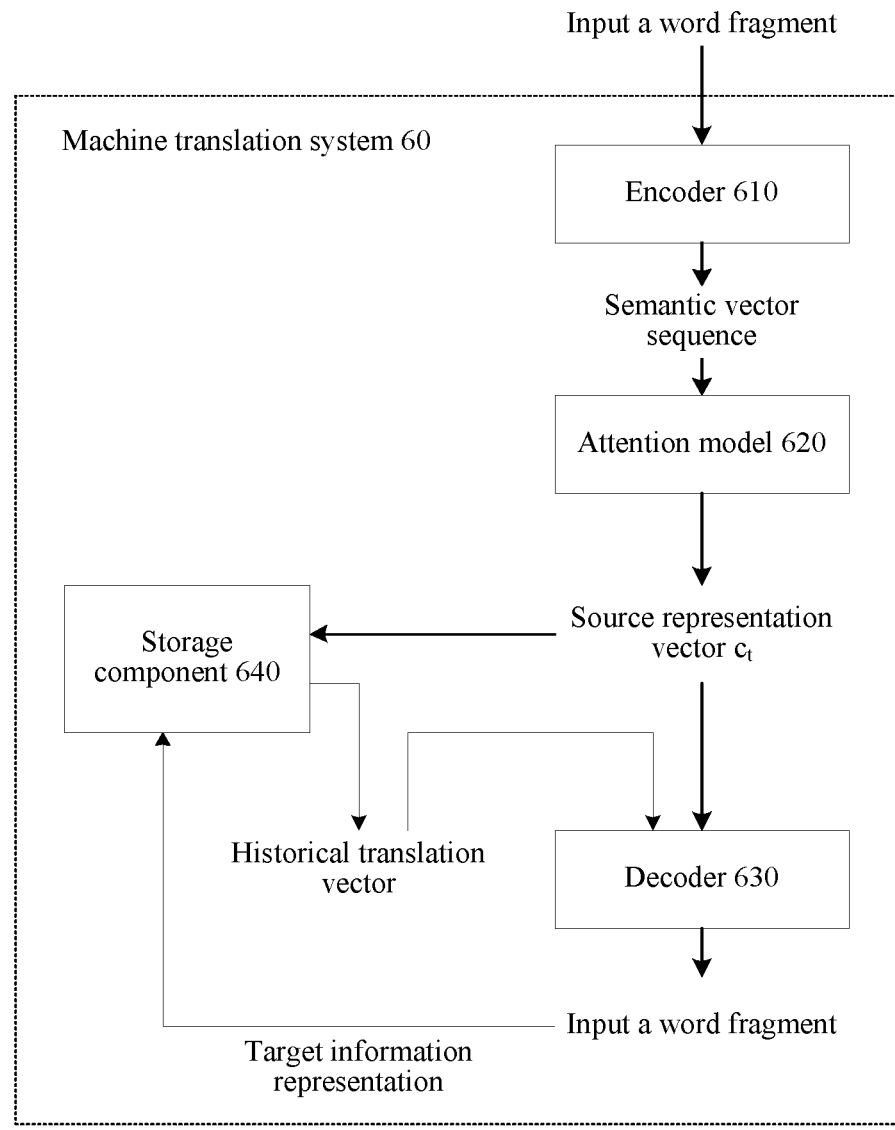
FIG. 6 is a schematic composition diagram of a machine translation system according to an exemplary embodiment.

Referring to FIG. 6, FIG. 6 shows a schematic composition diagram of a machine translation system according to an exemplary embodiment. The machine translation system 60 includes an encoder 610, an attention model 620, a decoder 630, and a storage component 640.

Step 1: The encoder 610 reads an input word fragment, outputs a source semantic vector sequence, and repeats steps 2 to 5 until a whole translation is generated.

Step 2: The attention model 620 reads a decoder state and generates a source representation vector $c_t$ of a moment t.

Step 3: The storage component 640 queries for historical translation information, reads $c_t$, and outputs a historical translation vector of the word fragment.

Step 4: The decoder 630 reads the historical translation vector output in step 3 and other standard input (for example, the source representation vector $c_t$ at the moment t) and generates a target word at a current moment.

Step 5: The storage component 640 updates a translation history, that is, updates source and target information representations (for example, the source representation vector $c_t$, a decoder state $s_t$ at the moment t, an output vector of the decoder at the moment t, and a target representation vector of a final translation result) into the historical translation information.

For a detailed execution process of the foregoing step 1 to step 5, refer to descriptions in the method embodiment shown in FIG. 2. Details are not described herein again.

Figure 7:
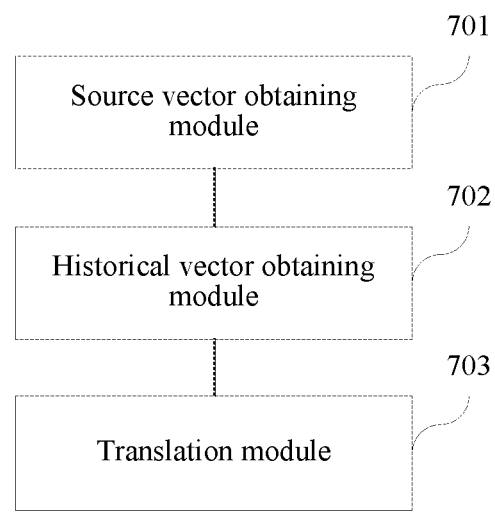
FIG. 7 is a structural block diagram of a machine translation apparatus according to an exemplary embodiment.

FIG. 7 is a structural block diagram of a machine translation apparatus according to an exemplary embodiment. The machine translation apparatus may be applied to a computer device (such as a user terminal or a server) providing a machine translation function based on an NMT system, to perform all or some steps in the embodiment shown in FIG. 2. The machine translation apparatus may include:

a source vector obtaining module 701, configured to obtain, in a case that a word fragment is translated from a first language into a second language, a source representation vector of the word fragment, the source representation vector being a vector representing a corresponding word fragment in the first language;

a historical vector obtaining module 702, configured to query for historical translation information according to the source representation vector of the word fragment, and obtain a historical translation vector of the word fragment, the historical translation vector being used to represent a historical translation situation corresponding to the word fragment; and a translation module 703, configured to translate the word fragment according to the historical translation vector of the word fragment.

Optionally, the historical vector obtaining module 702 includes:

a similarity calculation unit, configured to calculate similarities between the source representation vector of the word fragment and source representation vectors of the respective historical word fragments;

a first weight calculation unit, configured to calculate weights of the decoder states of the respective historical word fragments according to the similarities between the source representation vector of the word fragment and the source representation vectors of the respective historical word fragments; and a first weighting unit, configured to perform weighted summation on decoder states of the respective historical word fragments according to the weights of the decoder states of the respective historical word fragments, to obtain the historical translation vector of the word fragment, the historical translation information including correspondences between source representation vectors of respective historical word fragments and decoder states of the respective historical word fragments.

Optionally, the apparatus further includes:

a decoder state obtaining module, configured to obtain a decoder state of the word fragment; and a storage module, configured to store a correspondence between the source representation vector of the word fragment and the decoder state of the word fragment into the historical translation information.

Optionally, the translation module 703 includes:

a first output vector obtaining unit, configured to input the source representation vector of the word fragment, the decoder state of the word fragment, and a target representation vector of a previous word fragment into a first neural network, to obtain an output vector of the word fragment, the previous word fragment being a previous word fragment of the word fragment, and the target representation vector being a vector representing a corresponding word fragment in the second language;

a first weight obtaining unit, configured to input the source representation vector of the word fragment, the decoder state of the word fragment and the historical translation vector of the word fragment into a second neural network to obtain a weight of the historical translation vector of the word fragment;

a second weight calculation unit, configured to calculate a weight of the output vector of the word fragment according to the weight of the historical translation vector of the word fragment;

a second weighting unit, configured to perform weighted summation on the output vector of the word fragment and the historical translation vector of the word fragment according to the weight of the output vector of the word fragment and the weight of the historical translation vector of the word fragment, to obtain a corrected output vector of the word fragment; and a first result determining unit, configured to determine a translation result of the word fragment according to the corrected output vector of the word fragment.

Optionally, the translation module 703 includes:

a second output vector obtaining unit, configured to input the source representation vector of the word fragment, the decoder state of the word fragment, a target representation vector of a previous word fragment, and a historical translation vector of the word fragment into a third neural network, to obtain an output vector of the word fragment, the previous word fragment being a previous word fragment of the word fragment, and the target representation vector being a vector representing a corresponding word fragment in the second language; and a second result determining unit, configured to determine a translation result of the word fragment according to the output vector of the word fragment.

Optionally, the translation module 703 includes:

a second weight obtaining unit, configured to input the source representation vector of the word fragment, the decoder state of the word fragment and the historical translation vector of the word fragment into a fourth neural network to obtain a weight of the historical translation vector of the word fragment;

a third weight calculation unit, configured to calculate a weight of the decoder state of the word fragment according to the weight of the historical translation vector of the word fragment;

a third weighting unit, configured to perform weighted summation on the historical translation vector of the word fragment and the decoder state of the word fragment according to the weight of the historical translation vector of the word fragment and the weight of the decoder state of the word fragment, to obtain a corrected decoder state of the word fragment;

a third output vector obtaining unit, configured to input the source representation vector of the word fragment, the corrected decoder state of the word fragment, and a target representation vector of a previous word fragment into a fifth neural network, to obtain an output vector of the word fragment, the previous word fragment being a previous word fragment of the word fragment, and the target representation vector being a vector representing a corresponding word fragment in the second language; and a third result determining unit, configured to determine a translation result of the word fragment according to the output vector of the word fragment.

In conclusion, in the machine translation apparatus shown in some embodiments of this application, in a case that the word fragment is translated from the first language into the second language, after the source representation vector $c_t$ of the currently translated word fragment is obtained (the source representation vector is a vector representing a corresponding word fragment in the first language), historical translation information is queried for according to the source representation vector of the word fragment, a historical translation vector of the word fragment is obtained, and the word fragment is translated according to the historical translation vector of the word fragment. In the foregoing solution, in a case that a word fragment is translated, a translation situation of the word fragment in a historical translation process is considered comprehensively, and a current translation result is affected by the translation situation of the word fragment in the historical translation process. Because translation situations of a word fragment in a historical translation process have a relatively broad coverage, and may be some or all of translation situations of a translation system for same or similar word fragments before a current moment, a result of translating a word fragment by using the foregoing method is closer to a translation result of a same word fragment in the historical translation process, thereby improving translation accuracy.

In all of the foregoing embodiments of this application, this application is described by using machine translation as an example. In actual applications, the method provided by the embodiments of this application may be used for another sequence-to-sequence task such as speed recognition and artificial intelligence dialogs/questions and answers.

For example, in an exemplary embodiment of this application, in the field of speech recognition, after receiving input voice, a computer device may convert a voice segment into a source representation vector through an encoder and an attention model, and searches for a historical recognition vector of the voice segment by using the source representation vector (corresponding to the historical translation vector in machine translation), and affects a recognition result by using the historical recognition vector.

For another example, in another exemplary embodiment of this application, in the field of artificial intelligence dialogs/questions and answers, after receiving an input dialog/question, a computer device may convert the dialog/question into a source representation vector through an encoder and an attention model, and searches for a historical reply vector of the dialog/question by using the source representation vector (corresponding to the historical translation vector in machine translation), and affects a reply result by using the historical reply vector.

Figure 8:
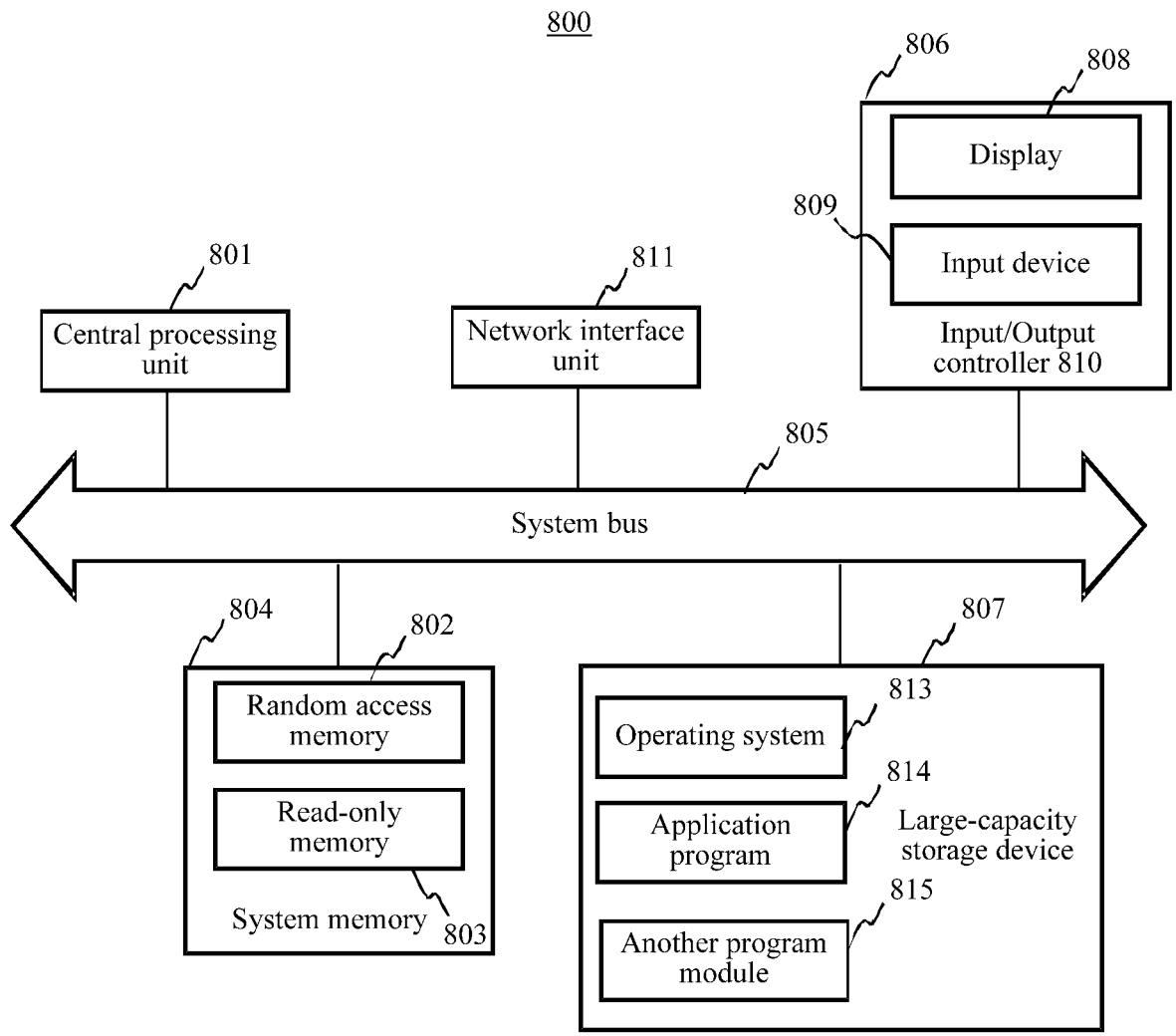
FIG. 8 is a schematic structural diagram of a server according to an exemplary embodiment.

FIG. 8 is a schematic structural diagram of a server according to an exemplary embodiment. The server 800 includes a central processing unit (CPU) 801, a system memory 804 including a random access memory (RAM) 802 and a read-only memory (ROM) 803, and a system bus 805 connecting the system memory 804 and the CPU 801. The server 800 further includes a basic input/output system (I/O system) 806 assisting in transmitting information between devices in a computer, and a large-capacity storage device 807 configured to store an operating system 813, an application program 814 and another program module 815.

The basic I/O system 806 includes a display 808 configured to display information and an input device 809, such as a mouse or a keyboard, configured to input information for a user. The display 808 and the input device 809 are both connected to the CPU 801 by using an input/output controller 810 connected to the system bus 805. The basic I/O system 806 may further include the input/output controller 810 to be configured to receive and process inputs from a plurality of other devices such as a keyboard, a mouse, and an electronic stylus. Similarly, the input/output controller 810 further provides an output to a display screen, a printer or another type of output device.

The large-capacity storage device 807 is connected to the CPU 801 by using a large-capacity storage controller (not shown) connected to the system bus 805. The large-capacity storage device 807 and its associated computer-readable medium provide non-volatile storage for the server 800. That is, the large-capacity storage device 807 may include the computer-readable medium (not shown) such as a hard disk or a CD-ROM driver.

Without loss of generality, the computer-readable medium may include a computer storage medium and a communications medium. The computer storage medium includes volatile and non-volatile media, and removable and non-removable media implemented by using any method or technology used for storing information such as a computer-readable instruction, a data structure, a program module or other data. The computer storage medium includes a RAM, a ROM, an EPROM, an EEPROM, a flash memory or other solid storage technologies; a CD-ROM, a DVD or other optical storages; and a cassette, a magnetic tape, a disk storage or other magnetic storage devices. Certainly, a person skilled in the art can learn that the computer storage medium is not limited to the foregoing several types. The system memory 804 and the large-capacity storage device 807 may be collectively referred to as a memory.

The server 800 may be connected to the Internet or another network device through a network interface unit 811 connected to the system bus 805.

The memory further includes one or more programs, the one or more programs are stored in the memory, and the central processing unit 801 performs the machine translation method shown in FIG. 2 by executing the one or more programs.

Figure 9:
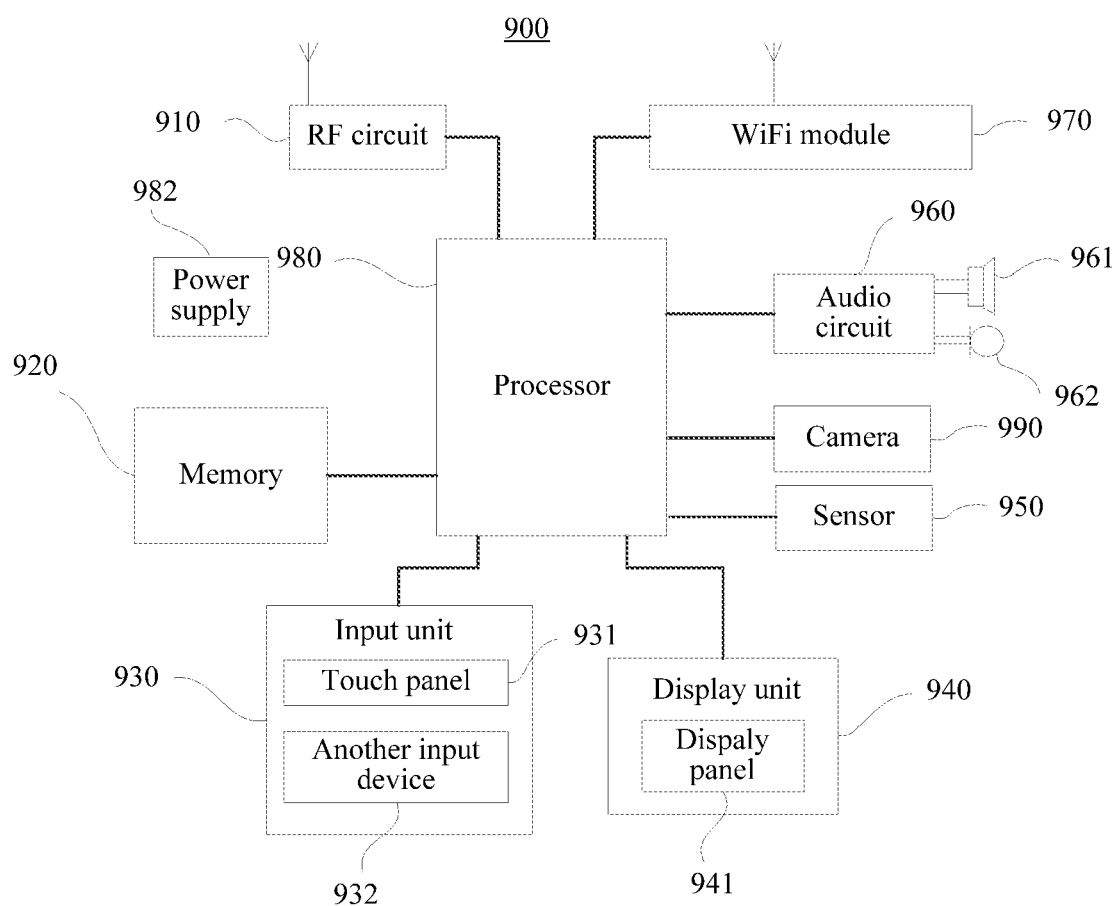
FIG. 9 is a schematic structural diagram of a user terminal according to an exemplary embodiment.

FIG. 9 is a schematic structural diagram of a user terminal 900 according to an exemplary embodiment. The user terminal 900 in some embodiments of this application may include one or more components as follows: a processor configured to execute a computer program instruction to complete various processes and methods, a random access memory (RAM) and a read-only memory (ROM) that are configured to store information and a program instruction, a memory configured to store data and information, an I/O device, an interface, an antenna, or the like. Specifically:

The user terminal 900 may include components such as a radio frequency (RF) circuit 910, a memory 920, an input unit 930, a display unit 940, a sensor 950, an audio circuit 960, a wireless fidelity (WiFi) module 970, a processor 980, a power supply 982, and a camera 990. A person skilled in the art may understand that a structure of the user terminal shown in FIG. 9 does not constitute a limitation to the user terminal, and the terminal may include more components or fewer components than those shown in the figure, or some components may be combined, or a different component deployment may be used.

The following makes specific introduction of components of the user terminal 900 with reference to FIG. 9.

The RF circuit 910 may be configured to receive and send a signal during an information receiving and sending process or a call process. Specifically, the RF circuit receives downlink information from a base station, then delivers the downlink information to the processor 980 for processing, and sends related uplink data to the base station. Generally, the RF circuit includes, but is not limited to, an antenna, at least one amplifier, a transceiver, a coupler, a low noise amplifier (LNA), and a duplexer. In addition, the RF circuit 910 may also communicate with a network and another device by wireless communication. The wireless communication may use any communication standard or protocol, including but not limited to Global System for Mobile communications (GSM), general packet radio service (GPRS), Code Division Multiple Access (CDMA), Wideband Code Division Multiple Access (WCDMA), Long Term Evolution (LTE), email, short messaging service (SMS), and the like.

The memory 920 may be configured to store a software program and module. The processor 980 runs the software program and module stored in the memory 920, to implement various functional applications and data processing of the user terminal 900. The memory 920 may mainly include a program storage area and a data storage area. The program storage area may store an operating system, an application program required by at least one function (such as a sound playback function and an image display function), and the like. The data storage area may store data (such as audio data and an address book) created according to use of the user terminal 900, and the like. In addition, the memory 920 may include a high speed random access memory, and may further include a non-volatile memory, such as at least one magnetic disk storage device, a flash memory, or other volatile solid-state storage devices.

The input unit 930 may be configured to receive input digit or character information, and generate a keyboard signal input related to the user setting and function control of the user terminal 900. Specifically, the input unit 930 may include a touch panel 931 and another input device 932. The touch panel 931, which may also be referred to as a touch screen, may collect a touch operation of a user on or near the touch panel (such as an operation of a user on or near the touch panel 931 by using any suitable object or accessory such as a finger or a stylus), and drive a corresponding connection apparatus according to a preset program. Optionally, the touch panel 931 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 980. Moreover, the touch controller can receive and execute a command sent by the processor 980. In addition, the touch panel 931 may be a resistive, capacitive, infrared, or surface sound wave type touch panel. In addition to the touch panel 931, the input unit 930 may further include the another input device 932. Specifically, the another input device 932 may include, but is not limited to: one or more of a physical keyboard, a functional key (such as a volume control key or a switch key), a track ball, a mouse, and a joystick.

The display unit 940 may be configured to display information entered by the user or information provided for the user, and various menus of the user terminal 900. The display unit 940 may include a display panel 941. Optionally, the display panel 941 may be configured by using a liquid crystal display (LCD), an organic light-emitting diode (OLED), or the like. Further, the touch panel 931 may cover the display panel 941. After detecting a touch operation on or near the touch panel 931, the touch panel 931 transfers the touch operation to the processor 980, so as to determine a type of a touch event. Then, the processor 980 provides corresponding visual output on the display panel 941 according to the type of the touch event. Although, in FIG. 9, the touch panel 931 and the display panel 941 are used as two separate parts to implement input and output functions of the user terminal 900, in some embodiments, the touch panel 931 and the display panel 941 may be integrated to implement the input and output functions of the user terminal 900.

The user terminal 900 may further include at least one sensor 950, such as a gyroscope sensor, a magnetic induction sensor, an optical sensor, a motion sensor, and another sensor. Specifically, the light sensor may include an ambient light sensor and a proximity sensor. The ambient light sensor may adjust luminance of the display panel 941 according to brightness of the ambient light. The proximity sensor may switch off the display panel 941 and/or backlight when the user terminal 900 is moved to the ear. As one type of motion sensor, an acceleration sensor may detect magnitude of accelerations in various directions (generally on three axes), may detect magnitude and a direction of the gravity when static, and may be applied to an application that recognizes the attitude of the terminal (for example, switching between landscape orientation and portrait orientation, a related game, and magnetometer attitude calibration), a function related to vibration recognition (such as a pedometer and a knock), and the like. Other sensors such as a barometer, a hygrometer, a thermometer, and an infrared sensor, which may be configured in the user terminal 900, are not further described herein.

The audio circuit 960, a speaker 981, and a microphone 962 may provide audio interfaces between the user and the user terminal 900. The audio circuit 960 may convert received audio data into an electric signal and transmit the electric signal to the speaker 961. The speaker 961 converts the electric signal into a sound signal for output. On the other hand, the microphone 962 converts a collected sound signal into an electric signal. The audio circuit 960 receives the electric signal and converts the electric signal into audio data, and outputs the audio data to the processor 980 for processing. Then, the processor 980 sends the audio data to, for example, another user terminal by using the RF circuit 910, or outputs the audio data to the memory 920 for further processing.

WiFi is a short distance wireless transmission technology. The user terminal 900 may help, by using the WiFi module 970, the user to receive and send emails, browse a web page, access streaming media, and so on, which provides wireless broadband Internet access for the user. Although FIG. 9 shows the WiFi circuit 970, it may be understood that the WiFi circuit 970 is not a necessary component of the user terminal 900, and when required, the WiFi circuit 970 may be omitted as long as the scope of the essence of this application is not changed.

The processor 980 is a control center of the user terminal 900, and connects to various parts of the user terminal by using various interfaces and lines. By running or executing the software program and/or module stored in the memory 920, and invoking data stored in the memory 920, the processor 980 performs various functions and data processing of the user terminal 900, thereby performing overall monitoring on the user terminal. Optionally, the processor 980 may include one or more processing units. Preferably, the processor 980 may integrate an application processor and a modem processor. The application processor mainly processes an operating system, a user interface, an application program, and the like. The modem processor mainly processes wireless communication. It may be understood that the foregoing modem processor may alternatively not be integrated into the processor 980.

The user terminal 900 further includes a power supply 982 (such as a battery) for supplying power to the components. Preferably, the power supply may be logically connected to the processor 980 by using a power management system, thereby implementing functions such as charging, discharging, and power consumption management by using the power management system.

The camera 990 is generally formed by a lens, an image sensor, an interface, a digital signal processor, a CPU, a display screen, and the like. The lens is fixed above the image sensor, and may change focusing by manually adjusting the lens. The image sensor is equivalent to a "film" of a conventional camera, and is the heart of the camera for collecting an image. The interface is configured to connect the camera to a mainboard of the user terminal by using a flat cable and a board-to-board connector and in a spring connection manner, and send the collected image to the memory 920. The digital signal processor processes the collected image by using a mathematical operation, converts a collected analog image into a digital image, and sends the digital image to the memory 920 by using the interface.

Although not shown in the figure, the user terminal 900 may further include a Bluetooth module and the like, which are not further described herein.

In addition to including one or more processors 980, the user terminal 900 further includes a memory and one or more modules. The one or more modules are stored in the memory and are configured to be executed by the one or more processors, to perform some or all steps of the machine translation method shown in FIG. 2.

In an exemplary embodiment, a non-transitory computer-readable storage medium including instructions, for example, a memory including a computer program (instructions), is further provided, and the foregoing program (instructions) may be executed by the processor of a computer device (for example, the foregoing user terminal or server) to complete the machine translation method shown in the embodiments of this application. For example, the non-transitory computer-readable storage medium may be a ROM, a random access memory (RAM), a CD-ROM, a magnetic tape, a floppy disk, or an optical data storage device.

After considering the specification and practicing the present disclosure, a person skilled in the art would easily conceive of other implementations of this application. This application is intended to cover any variation, use, or adaptive change of this application. These variations, uses, or adaptive changes follow the general principles of this application and include common general knowledge or common technical means in this technical field, which are not disclosed in this application. The specification and the embodiments are considered as merely exemplary, and the real scope and spirit of this application are pointed out in the following claims.

It is to be understood that this application is not limited to the precise structures described above and shown in the accompanying drawings, and various modifications and changes can be made without departing from the scope of the present disclosure. The scope of this application is limited only by the appended claims.

What is claimed is:

1. A machine translation method, being executed by a computer device and comprising:
   obtaining, when translating a word fragment from a first language into a second language, a source representation vector of the word fragment, the source representation vector of the word fragment representing the word fragment in the first language;
   obtaining a historical translation vector of the word fragment by querying historical translation information according to the source representation vector of the word fragment, the historical translation vector of the word fragment representing a historical translation situation corresponding to the word fragment, and the historical translation information comprises correspondences between source representation vectors of respective historical word fragments and decoder states of the respective historical word fragments; and
   translating the word fragment according to the historical translation vector of the word fragment;
   wherein obtaining the historical translation vector of the word fragment comprises:
      calculating weights of the decoder states of the respective historical word fragments according to similarities between the source representation vector of the word fragment and the respective source representation vectors of the respective historical word fragments; and
      performing weighted summation on the decoder states of the respective historical word fragments according to the weights of the decoder states of the respective historical word fragments, to obtain the historical translation vector of the word fragment, and translating the word segment comprises:

obtaining, by using a neural network, an output vector of the word fragment, an input of the neural network including at least the source representation vector of the word fragment, a decoder state of the word fragment, and the historical translation vector of the word fragment; and determining a translation result according to the output vector of the word fragment.

2. The method according to claim 1, further comprising: storing a correspondence between the source representation vector of the word fragment and the decoder state of the word fragment into the historical translation information.

3. The method according to claim 1, wherein translating the word fragment according to the historical translation vector of the word fragment comprises:

inputting the source representation vector of the word fragment, the decoder state of the word fragment, and a target representation vector of a previous word fragment into a first neural network, to obtain the output vector of the word fragment, the previous word fragment being a word fragment preceding the word fragment currently being translated, and the target representation vector of the previous word fragment representing the previous word fragment in the second language;

inputting the source representation vector of the word fragment, the decoder state of the word fragment and the historical translation vector of the word fragment into a second neural network to obtain a weight of the historical translation vector of the word fragment;

calculating a weight of the output vector of the word fragment according to the weight of the historical translation vector of the word fragment;

performing weighted summation on the output vector of the word fragment and the historical translation vector of the word fragment according to the weight of the output vector of the word fragment and the weight of the historical translation vector of the word fragment, to obtain an adjusted output vector of the word fragment; and determining the translation result of the word fragment according to the adjusted output vector of the word fragment.

4. The method according to claim 1, wherein the translating the word fragment according to the historical translation vector of the word fragment comprises:

inputting the source representation vector of the word fragment, the decoder state of the word fragment, a target representation vector of a previous word fragment, and a historical translation vector of the word fragment into a third neural network, to obtain the output vector of the word fragment, the previous word fragment being a word fragment preceding the word fragment currently being translated, and the target representation vector representing a corresponding word fragment in the second language; and determining the translation result of the word fragment according to the output vector of the word fragment.

5. The method according to claim 1, wherein the translating the word fragment according to the historical translation vector of the word fragment comprises:

inputting the source representation vector of the word fragment, the decoder state of the word fragment and the historical translation vector of the word fragment into a fourth neural network to obtain a weight of the historical translation vector of the word fragment;

calculating a weight of the decoder state of the word fragment according to the weight of the historical translation vector of the word fragment;

performing weighted summation on the historical translation vector of the word fragment and the decoder state of the word fragment according to the weight of the historical translation vector of the word fragment and the weight of the decoder state of the word fragment, to obtain an adjusted decoder state of the word fragment;

inputting the source representation vector of the word fragment, the adjusted decoder state of the word fragment, and a target representation vector of a previous word fragment into a fifth neural network, to obtain the output vector of the word fragment, the previous word fragment being a word fragment preceding the word fragment currently being translated, and the target representation vector of the previous word fragment representing the previous word fragment in the second language; and determining the translation result of the word fragment according to the output vector of the word fragment.

6. The method according to claim 1, further comprising:

integrating the historical translation vector of the word fragment into a neural network system directed to translate the word fragment by at least one of: probability interpolation, auxiliary context input, or hidden layer representation interpolation.

7. A machine translation apparatus, comprising:

a memory; and a processor coupled to the memory and configured to:

obtain, when translating a word fragment from a first language into a second language, a source representation vector of the word fragment, the source representation vector of the word fragment representing the word fragment in the first language;

obtain a historical translation vector of the word fragment by querying historical translation information according to the source representation vector of the word fragment, and, the historical translation vector of the word fragment representing a historical translation situation corresponding to the word fragment, and the historical translation information comprises correspondences between source representation vectors of respective historical word fragments and decoder states of the respective historical word fragments; and translate the word fragment according to the historical translation vector of the word fragment, wherein obtaining the historical translation vector of the word fragment comprises:

calculating weights of the decoder states of the respective historical word fragments according to similarities between the source representation vector of the word fragment and the respective source representation vectors of the respective historical word fragments; and performing weighted summation on the decoder states of the respective historical word fragments according to the weights of the decoder states of the respective historical word fragments, to obtain the historical translation vector of the word fragment, and translating the word segment comprises:

obtaining, by using a neural network, an output vector of the word fragment, an input of the neural network including at least the source representation vector of the word fragment, a decoder state of the word fragment, and the historical translation vector of the word fragment; and determining a translation result according to the output vector of the word fragment.

8. The apparatus according to claim 7, wherein the processor is further configured to:
store a correspondence between the source representation vector of the word fragment and the decoder state of the word fragment into the historical translation information.

9. The apparatus according to claim 7, wherein the processor is further configured to:
input the source representation vector of the word fragment, the decoder state of the word fragment, and a target representation vector of a previous word fragment into a first neural network, to obtain the output vector of the word fragment, the previous word fragment being a word fragment preceding the word fragment currently being translated, and the target representation vector of the previous word fragment representing the previous word fragment in the second language;
input the source representation vector of the word fragment, the decoder state of the word fragment and the historical translation vector of the word fragment into a second neural network to obtain a weight of the historical translation vector of the word fragment;
calculate a weight of the output vector of the word fragment according to the weight of the historical translation vector of the word fragment;
perform weighted summation on the output vector of the word fragment and the historical translation vector of the word fragment according to the weight of the output vector of the word fragment and the weight of the historical translation vector of the word fragment, to obtain an adjusted output vector of the word fragment; and
determine the translation result of the word fragment according to the adjusted output vector of the word fragment.

10. The apparatus according to claim 7, wherein the processor is further configured to:
input the source representation vector of the word fragment, the decoder state of the word fragment, a target representation vector of a previous word fragment, and a historical translation vector of the word fragment into a third neural network, to obtain the output vector of the word fragment, the previous word fragment being a word fragment preceding the word fragment currently being translated, and the target representation vector of the previous word fragment representing the previous word fragment in the second language; and
determine the translation result of the word fragment according to the output vector of the word fragment.

11. The apparatus according to claim 7, wherein the processor is further configured to:
input the source representation vector of the word fragment, the decoder state of the word fragment and the historical translation vector of the word fragment into a fourth neural network to obtain a weight of the historical translation vector of the word fragment;
calculate a weight of the decoder state of the word fragment according to the weight of the historical translation vector of the word fragment;
perform weighted summation on the historical translation vector of the word fragment and the decoder state of the word fragment according to the weight of the historical translation vector of the word fragment and the weight of the decoder state of the word fragment, to obtain an adjusted decoder state of the word fragment;
input the source representation vector of the word fragment, the adjusted decoder state of the word fragment, and a target representation vector of a previous word fragment into a fifth neural network, to obtain the output vector of the word fragment, the previous word fragment being a word fragment preceding the word fragment currently being translated, and the target representation vector of the previous word fragment representing the previous word fragment in the second language; and
determine the translation result of the word fragment according to the output vector of the word fragment.

12. The apparatus according to claim 7, wherein the processor is further configured to: integrate the historical translation vector of the word fragment into a neural network system directed to translate the word fragment by at least one of: probability interpolation, auxiliary context input, or hidden layer representation interpolation.

13. A non-transitory computer-readable storage medium storing computer program instructions executable by at least one processor to perform:
obtaining, when translating a word fragment from a first language into a second language, a source representation vector of the word fragment, the source representation vector of the word fragment representing the word fragment in the first language;
obtaining a historical translation vector of the word fragment by querying historical translation information according to the source representation vector of the word fragment, the historical translation vector of the word fragment representing a historical translation situation corresponding to the word fragment, and the historical translation information comprises correspondences between source representation vectors of respective historical word fragments and decoder states of the respective historical word fragments; and
translating the word fragment according to the historical translation vector of the word fragment,
wherein obtaining the historical translation vector of the word fragment comprises:
calculating weights of the decoder states of the respective historical word fragments according to similarities between the source representation vector of the word fragment and the respective source representation vectors of the respective historical word fragments; and
performing weighted summation on the decoder states of the respective historical word fragments according to the weights of the decoder states of the respective historical word fragments, to obtain the historical translation vector of the word fragment, and translating the word segment comprises:
obtaining, by using a neural network, an output vector of the word fragment, an input of the neural network including at least the source representation vector of the word fragment, a decoder state of the word fragment, and the historical translation vector of the word fragment; and
determining a translation result according to the output vector of the word fragment.

14. The storage medium according to claim 13, wherein the computer program instructions further cause the at least one processor to perform;

obtaining a decoder state of the word fragment; and storing a correspondence between the source representation vector of the word fragment and the decoder state of the word fragment into the historical translation information.

15. The storage medium according to claim 13, wherein translating the word fragment according to the historical translation vector of the word fragment comprises:

inputting the source representation vector of the word fragment, the decoder state of the word fragment, and a target representation vector of a previous word fragment into a first neural network, to obtain the output vector of the word fragment, the previous word fragment being a word fragment preceding the word fragment currently being translated, and the target representation vector of the previous word fragment representing the previous word fragment in the second language;

inputting the source representation vector of the word fragment, the decoder state of the word fragment and the historical translation vector of the word fragment into a second neural network to obtain a weight of the historical translation vector of the word fragment;

calculating a weight of the output vector of the word fragment according to the weight of the historical translation vector of the word fragment;

performing weighted summation on the output vector of the word fragment and the historical translation vector of the word fragment according to the weight of the output vector of the word fragment and the weight of the historical translation vector of the word fragment, to obtain an adjusted output vector of the word fragment; and determining the translation result of the word fragment according to the adjusted output vector of the word fragment.

16. The storage medium according to claim 13, wherein the translating the word fragment according to the historical translation vector of the word fragment comprises:

inputting the source representation vector of the word fragment, the decoder state of the word fragment, a target representation vector of a previous word fragment, and a historical translation vector of the word fragment into a third neural network, to obtain the output vector of the word fragment, the previous word fragment being a word fragment preceding the word fragment currently being translated, and the target representation vector representing a corresponding word fragment in the second language; and determining the translation result of the word fragment according to the output vector of the word fragment.

17. The storage medium according to claim 13, wherein the translating the word fragment according to the historical translation vector of the word fragment comprises:

inputting the source representation vector of the word fragment, the decoder state of the word fragment and the historical translation vector of the word fragment into a fourth neural network to obtain a weight of the historical translation vector of the word fragment;

calculating a weight of the decoder state of the word fragment according to the weight of the historical translation vector of the word fragment;

performing weighted summation on the historical translation vector of the word fragment and the decoder state of the word fragment according to the weight of the historical translation vector of the word fragment and the weight of the decoder state of the word fragment, to obtain an adjusted decoder state of the word fragment;

inputting the source representation vector of the word fragment, the adjusted decoder state of the word fragment, and a target representation vector of a previous word fragment into a fifth neural network, to obtain the output vector of the word fragment, the previous word fragment being a word fragment preceding the word fragment currently being translated, and the target representation vector of the previous word fragment representing the previous word fragment in the second language; and determining the translation result of the word fragment according to the output vector of the word fragment.

* * * * *